May 5, 1942.  A. J. SPELKER  2,282,260
METHOD OF ELECTROFORMING MARKING TOOLS
Filed April 11, 1940   2 Sheets-Sheet 1
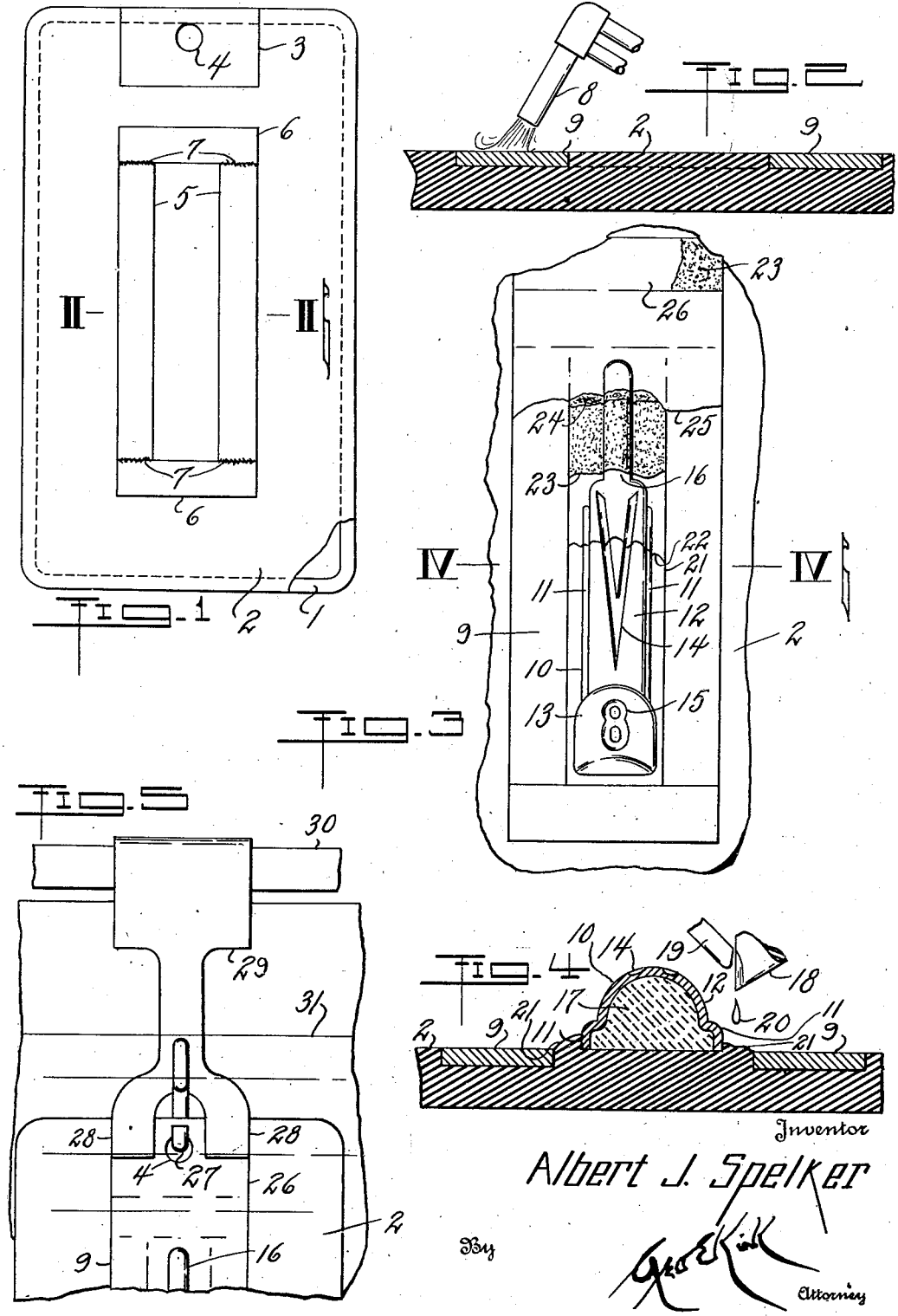
Inventor
Albert J. Spelker
By
Attorney May 5, 1942.  A. J. SPELKER  2,282,260
METHOD OF ELECTROFORMING MARKING TOOLS
Filed April 11, 1940  2 Sheets-Sheet 2
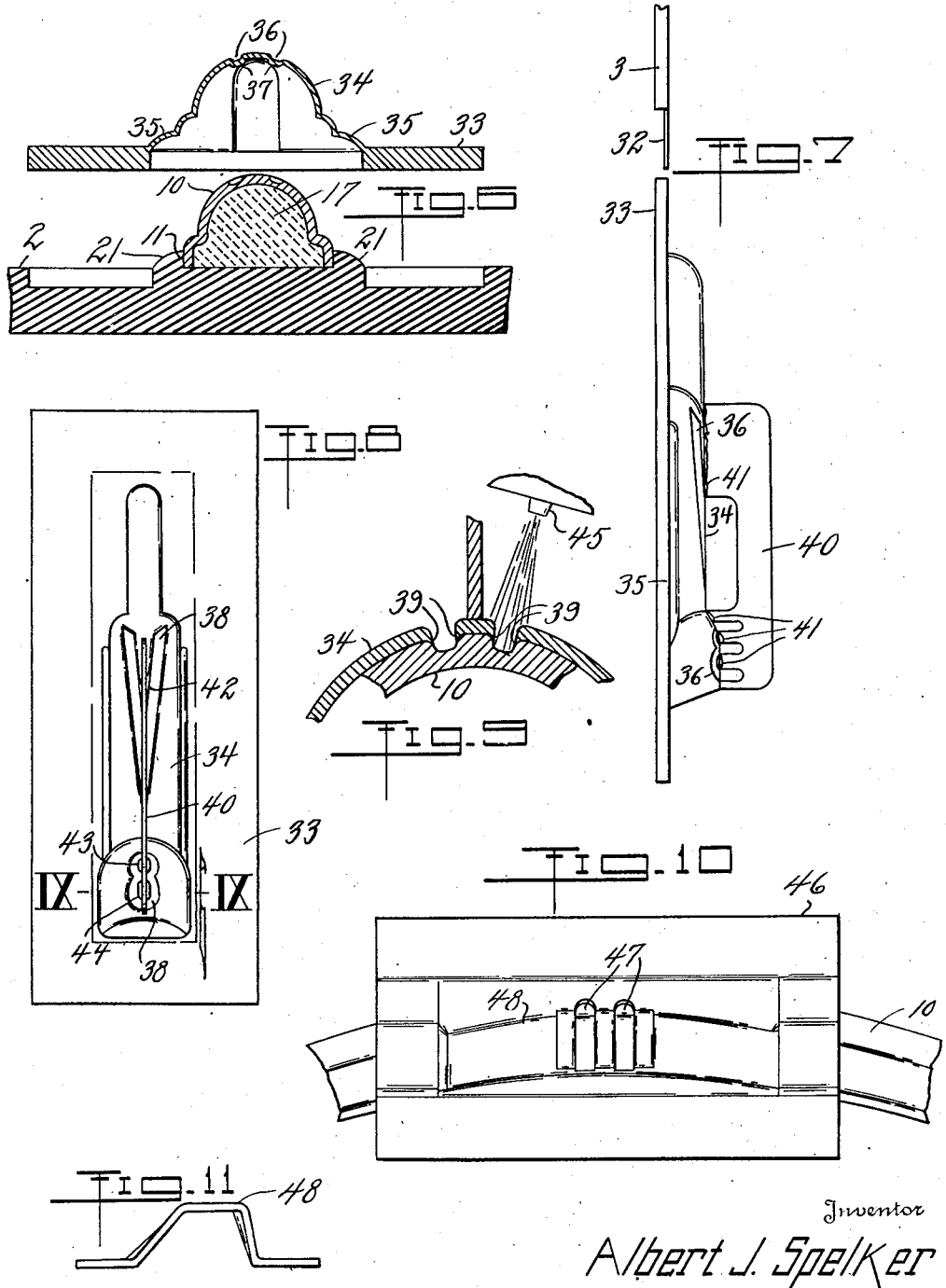

Patented May 5, 1942

2,282,260

UNITED STATES PATENT OFFICE 2,282,260

METHOD OF ELECTROFORMING MARKING TOOLS

Albert J. Spelker, Toledo, Ohio

Application April 11, 1940, Serial No. 329,124

4 Claims. (Cl. 204—11)

This invention relates to the control of outlines upon an object.

This invention has utility in production of a definite form tool and such tool for repetitive marking-out of special form or contour upon articles.

Referring to the drawings:

Fig. 1 is a plan view, with parts broken away, of a base including a frame therewith as an early step toward the carrying out of the invention herein;

Fig. 2 is a section on the line II—II, Fig. 1, with parts broken away, showing the setting of the frame into the base;

Fig. 3 is a view, with parts broken away, looking at the base with the frame thereon and an article set therein with a sequence of progress in the development of a tool or complementary proof hereunder;

Fig. 4 is a section on the line IV—IV, Fig. 3, showing the article on the base bounded by the frame as in the process of anchoring;

Fig. 5 is a view, with parts broken away, of the base carrying the frame and anchored article as coated for a terminal to be introduced or suspended into an electrolytic bath for plating;

Fig. 6 is a distributed view showing the lifting of the tool assembly unit with proof and frame away from the article and base;

Fig. 7 is a side elevation of the proof in the frame with the conductor terminal as severed therefrom;

Fig. 8 is a plan view of the completed tool of Fig. 7, with marking definitions scant cut through for openings, with bridge bond prior-set, antecedent to the completion of the openings;

Fig. 9 is a section on the line IX—IX, Fig. 8, showing the setting of the tool in position as to an article with the marking effected, as by spraying a pigment through the openings;

Fig. 10 is a view in plan of a tool or mask, for stencil of shield effective extent, having a pair of parallel openings for marking medially located; and Fig. 11 is an end elevation of the tool or screen of Fig. 10.

In the carrying out of the invention herein, endless metal element 1 provides bonds for wax body 2 in completing a base having therewith terminal 3 with anchor or hanger opening 4 therein. On the wax 2 of such base may be placed strips 5, 6, say of brass having weld anchorage 7 therebetween in completing a frame. This frame, as located medially of the base, may have torch 8 (Fig. 2) controlled for heating action upon frame 9, built up of the parts 5, 6, as assembled by weld 7. This heating action on the frame 9 causes such to melt the wax or settle into the wax 2 of the base and such is conducted to flush position as an assembly of the frame with the base and definitely anchored. Surplus wax is smoothed or scraped off to the plane of the frame 9.

With such frame 9 as bounds and held in the ways 2 of the base, there may be placed article 10 as the specimen or emblem for the finished product. This article 10 (Fig. 3) is shown with drop sides 11, arch portion 12, dome portion 13, and depressed or intaglio markings 14, 15. In practice, markings may be planar or even cameo. This article or proof emblem 10 further has terminal extension 16. In practice, this emblem, when arched and of a light gage material, may have cast reinforcing filler 17 (Fig. 4) as of gypsum. As thus assembled and set flush with the frame 9, heating tool 18 may act upon wax stick 19 to fuse off drops 20 therefrom in building up lock or anchor 21, thereby so to place the article or emblem 10 against shifting relatively to the frame 9. There is accordingly assembled the article or ornament with the frame by this wax lock.

The next stage is to coat, as by spraying a film or liquid resist 22 of lacquer, such not to apply to the frame 9 but may cover the wax lock portion 21 and from there complete a bridge with the frame across the article 10, including the markings. Upon such there is then dusted finely powdered conductor, as graphite 23, to the extent of this resistor lacquer coating 22. This lacquer is a thin film. In practice, this lacquer may approach colorless, color of water, or white, while the wax 2, 21, may be dark or black. This wax is desirably not readily frangible but of firmness under the normal working temperatures. This graphite as dusted to approximate a uniform application thereof to the resist 22 may then have a fine dust or powder of iron 24 thereon for the extent of the resist 22 and accordingly of the graphite 23. This iron dust 24 as on the graphite 23 is then given a wash treatment with copper sulphate solution for chemical reaction or plating 25, in that the iron dust on the graphite as about the resist is converted into a copper with the iron passing off into the sulphate. Further, there is a water wash from this plate washing to limit the extent of this unitary electrode to the bounds of the frame. There is thus an effective terminal with this bridge not only for the article 10 as bounded by the frame 9 but between the frame 9 and the terminal 3 in providing connector 26.

As the bounds of the frame are cleansed, this base, with the frame anchored therewith, including the article as coated for a terminal, may have its hanger opening 4 engaged by hook 27 (Fig. 5) to swing against forked stop 28 of hanger 29 upon conductor bar 30, thus to be suspended in the electrolytic bath 31 in electroplating operation as one of the terminals. In this electrolytic action, deposit of copper may be had from the electrolytic bath. This may be to the extent of from $\frac{1}{32}$ up to $\frac{1}{16}$ of an inch within a period of ten to twelve hours. The weight or thickness is of substantial body-providing characteristic for this coating and accordingly the extent of the conduct of the plating operation may vary according to the mass of wall desired for this tool or complemental proof.

At the completion of this bath in electrolyte, the operator may, through the hanger 3 pull such as to the base 1, 2, and plating 32 at the bridging region 26 (Fig. 7) is a definite connection to tool 33 of the plating anchoring the frame 9 as a unit therewith. The resist 22 cooperates to render the tool unit 33 readily partable from the article. Accordingly one, from the opening 4, may lift this frame unit 33 from the base and clear of the article 10 with proof 34 (Fig. 6) assembled by portion 35 with the frame or main portion 33. These portions 35 are over the lock portions 21 as connecting the reinforcement or main frame. Inasmuch as the markings 14, 15, are countersunk, this proof 34, in its plating operation and approximating uniform coat or plating throughout, has exterior depressions 36, which, on the opposite or interior side of the proof 34, form ribs 37.

In the carrying out of the invention herein, the first step is to sever this hanger 3 and its tongue or connecting strip 32 from the tool 33 and marginally finish or clear up this tool 33 against roughness.

The next stage is that the operator at these regions 36 disturbs the continuity by producing openings 38 registering at the character outline of the marking sought. To this end, a coping or jeweler's saw may be operated at such position scant of the extent of the depression 36 as to leave at the openings 38 inwardly a projecting endless uniform extent lip free edge or fin 39 as the bounding region on the side to contact the repetitive or duplicate article 10 in the use of this proof tool.

In the operation, when there be form for this marking, the cutting away, removing or trimming of which may depart from rigidity in the tool, a convenient mode of operation is to effect the cutting as in a position which is initially accessible, with such cutting only fragmentary. Bridge 40 is then located by cold solder 41 in definite anchorage with the unit 34, thereby holding portions 42, 43, 44, positively in the unit 34. Thereafter the marking openings 38 are completed. There is thus insured against disturbance this full region of marking for the tool or counterproof of the replica of the article. The bridge 40 accordingly serves as a convenient handle for setting the tool upon repetitive article 10 so that markings 14 thereon are appropriately in register with the fins 39 slightly nesting to provide background one way therefrom and foreground the other way at the offset for the relief, whether intaglio or cameo. Pigment or spray applying tool 45 may then be a means for quickly applying the marking at the exposed outline position, and this is held effectively against any spread upon the article 10. This localized speedy application to an ornament or emblem may be a function carried forward with rapidity. As the tool may have deposit of spray or pigment material accumulate thereon, the tool may be set aside for cleansing operation. Re-use is a speed-up of accuracy in high grade art work, neatness, and entire absence of requiring supplemental care or attention.

In lieu of tool 33 there may be tool 46 (Fig. 10) wherein openings 47 may cross rib 48 and may not involve matter of bridge or supplemental handle for the tool.

Under the invention herein as a master, a completed article may be taken to serve as a form. Therefrom a proof is taken, as herein disclosed, by plating operation including electrolytic. The resulting substantial tool is one with accuracy for register in the regions of such small fraction as to eliminate any objectionable appearance of smear. Furthermore, it is one which will permit functioning at a rate of production with relatively unskilled labor.

What is claimed and it is desired to secure by United States Letters Patent is:

1. The method of producing a tool for marking a surface portion corresponding to a given sunken design of an article, comprising the mounting of a proof having the design on its face, forming a thin film of lacquer on the proof, spraying graphite on the film, electrodepositing a counterproof thereon, carrying deposition to such an extent to deposit substantially beyond the edge portion of the design, stripping the counterproof of the deposit from the proof, trimming the beyond-the-edge portion of the counterproof to form an offset fin so that it is adapted to register with the design.

2. The method of producing a tool for marking a surface portion corresponding to a given sunken design of an article, comprising selecting a proof with the desired design, coating the proof with a stripping intermediate film of resist for ready release of counterproof therefrom, coating the proof with a conductive layer, electrodepositing the counterproof on the coated proof to such an extent to carry the deposition substantially beyond the edge portion of the design, stripping the counterproof from the proof, and trimming the beyond-the-edge portion of the design to form an offset fin so that it is adapted to register with the design.

3. The method of producing a tool for marking a surface portion corresponding to a given sunken design of an article, comprising selecting a proof with the desired design, coating the proof with a stripping intermediate film of resist for ready release of counterproof therefrom, coating the proof with a conductive layer, electrodepositing the counterproof on the coated proof to such an extent to carry the deposition substantially beyond the edge portion of the design, stripping the counterproof from the proof, bridging to position the design with the counterproof, and trimming the beyond-the-edge portion of the design to form an offset fin so that it is adapted to register with the design.

4. The method of producing a tool for marking a surface portion corresponding to a given sunken design of an article, comprising selecting a proof with the desired design, providing a frame to bound the proof, coating the proof with a stripping intermediate film of resist for ready release of counterproof therefrom, coating the proof with a conductive layer, electrodepositing the counterproof on the coated proof and frame to such an extent to carry the deposition substantially beyond the edge portion of the design, stripping the counterproof with the frame from the proof, and trimming the beyond-the-edge portion of the design to form an offset fin so that it is adapted to register with the design.

ALBERT J. SPELKER.